UNITED STATES PATENT OFFICE 2,527,640

STABILIZATION OF HYDROPEROXIDES

Eugene J. Lorand, Wilmington, Del., and John E. Reese, St. Simon Island, Ga., assignors to Hercules Powder Company, Wilmington, Del., a corporation of Delaware No Drawing. Application May 15, 1947,
Serial No. 748,344

14 Claims. (Cl. 260—610)

This invention relates to the oxidation of alkyl-substituted aromatic compounds having the structural formula

in which $R_1$ and $R_2$ represent alkyl groups and Ar represents a substituent selected from the group consisting of aryl and alkaryl groups. More particularly, the invention relates to the stabilization of reaction mixtures and certain reaction products produced by the oxidation of compounds such as p-cymene.

It is known that p-cymene, for example, may be oxidized either in the liquid phase or the vapor phase by means of air or molecular oxygen to reaction products which may include p-toluic acid, terephthalic acid, p-methylacetophenone, cumic acid, cumaldehyde, α,α-dimethyl-p-methylbenzyl alcohol and p-methyl-α-methyl styrene, the particular reaction products obtained being dependent upon whether a liquid phase or a vapor phase is utilized, the reaction temperature involved, and the catalyst used. By proper control of reaction conditions and reactants it also is possible to obtain substantial amounts of hydroperoxy derivatives having the structural formula

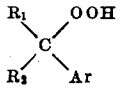

in which $R_1$ and $R_2$ represent alkyl groups, Ar represents a substituent selected from the group consisting of aryl and alkaryl groups, and the —OOH group represents a hydroperoxy group. These hydroperoxy derivatives are α,α-dialkylarylmethyl, or aryl(dialkyl)methyl, hydroperoxides, and they are somewhat sensitive to thermal decomposition and also are very unstable in the presence of acids. The instability of these hydroperoxides in the presence of acids is quite in contrast to the situation relative to hydrogen peroxide and tert-butyl hydroperoxide, both of which are stable in the presence of acidic materials. Hydrogen peroxide, for example, is relatively stable in an acid medium but quite unstable in an alkaline medium, and tert-butyl hydroperoxide is stabilized by the presence of metaphosphoric acid.

Now in accordance with this invention it has been found that the α,α-dialkylarylmethyl hydroperoxides may be stabilized by adding thereto a water-soluble inorganic alkali. There are thus formed hydroperoxide compositions comprising α,α-dialkylarylmethyl hydroperoxides and a water-soluble inorganic alkali, and these compositions are sufficiently stable that they may be safely stored and transported without loss of their effectiveness as hydroperoxides and without danger of decomposition.

In carrying out this invention the stabilization is effected by adding a small amount of a water-soluble inorganic alkali to the α,α-dialkylarylmethyl hydroperoxide. The resulting composition is more resistant to decomposition at ordinary or moderately elevated temperatures and therefore stands up better on storage and transport than the hydoperoxide alone.

Now, having generally outlined the embodiments of this invention, the following examples constitute specific illustrations. All amounts are based on parts by weight.

Example 1

A sample of the material obtained by oxidizing cumene with oxygen, followed by distillation under reduced pressure, and containing 98.6% of α,α-dimethylbenzyl hydroperoxide was maintained at a temperature of 2–16° C. for 325 days. At the end of this time the amount of α,α-dimethylbenzyl hydroperoxide had decreased to 0.35%. A similar sample, prepared by stripping the unreacted cumene from a reaction mixture obtained by oxidizing cumene with oxygen, and containing 92% of α,α-dimethylbenzyl hydroperoxide was stabilized by addition to the sample of 2 parts of the sodium salt of a dehydrogenated rosin (dehydroabietic acid, 53%; abietic acid, 0.0%; retene, 0.2%) per 1000 parts of the sample. The stabilized material then was maintained at a temperature of 2–16° C. for 280 days. At the end of this time the amount of α,α-dimethylbenzyl hydroperoxide was 83.4%.

Example 2

A sample of the material obtained by oxidizing cumene with oxygen, followed by distillation under reduced pressure, and containing 83% of α,α-dimethylbenzyl hydroperoxide was subjected to an accelerated decomposition test by maintaining the sample at a temperature of 70° C. At the end of 17 days the amount of α,α-dimethylbenzyl hydroperoxide had decreased to 1.3%. A similar sample containing originally the same amount of α,α-dimethylbenzyl hydroperoxide (83%) was stabilized by addition to the sample of about 3 parts of a 5% aqueous sodium hydroxide solution per 100 parts of the sample. The stabilized material then was subjected to an accelerated decomposition test by maintaining it at a temperature of 70° C. At the end of 31 days the amount of $\alpha,\alpha$-dimethylbenzyl hydroperoxide was 70% and at the end of 40 days was 61.4%.

Example 3

A sample of the material obtained by oxidizing p-diisopropylbenzene with oxygen, followed by distillation under reduced pressure, and containing 87.2% of $\alpha,\alpha$-dimethyl-p-isopropylbenzyl hydroperoxide was maintained at a temperature of 2–16° C. for 472 days. At the end of this time the amount of $\alpha,\alpha$-dimethyl-p-isopropylbenzyl hydroperoxide had decreased to 6.1%. Another sample of the same material, containing 87.2% of $\alpha,\alpha$-dimethyl-p-isopropylbenzyl hydroperoxide, was subjected to an accelerated decomposition test by maintaining it at a temperature of 50° C. At the end of 7 days the amount of hydroperoxide had decreased to 2.2%.

Example 4

A sample of the material obtained by oxidizing p-diisopropylbenzene with oxygen, followed by distillation under reduced pressure, and containing 83.8% of $\alpha,\alpha$-dimethyl-p-isopropylbenzyl hydroperoxide was subjected to a temperature of 25° C. The hydroperoxide began to decompose almost immediately. Another sample of the same material was stabilized by addition to the sample of 0.465 part of a 5% aqueous sodium hydroxide solution per 100 parts of the sample. The stabilized material was maintained at a temperature of 2–16° C. for 383 days. At the end of this time the amount of hydroperoxide was 70%. To the sample then was added an additional amount, 1.24 parts per 100 parts of the sample, of a 5% aqueous sodium hydroxide solution and 0.8 part of a 25% aqueous sodium hydroxide solution per 100 parts of the sample. The sample (70% hydroperoxide) then was subjected to an accelerated decomposition test by maintaining it at a temperature of 70° C. for 9 days. Upon completion of the accelerated test the amount of $\alpha,\alpha$-dimethyl-p-isopropylbenzyl hydroperoxide was 61.9%.

Example 5

A sample of the crystalline material produced by oxidizing p-diisopropylbenzene with oxygen, followed by cooling and filtration of the oxidation reaction mixture to obtain the crystalline material, which contained 87.3% of $\alpha,\alpha,\alpha',\alpha'$-tetramethyl-p-xylene dihydroperoxide, was subjected to a temperature of about 20° C. The dihydroperoxide began to decompose almost immediately. Another sample of the same material was stabilized by washing it with about 75 parts of a 1% aqueous sodium hydroxide solution per 100 parts of the sample. The stabilized material was maintained at a temperature of 2–16° C. for 356 days. At the end of this time the amount of dihydroperoxide was 74.3%. The sample then was subjected to an accelerated decomposition test by maintaining it at a temperature of 70° C. for 15 days. In this time the amount of $\alpha,\alpha,\alpha',\alpha'$-tetramethyl-p-xylylene dihydroperoxide decreased from 74.3% to 72.9%.

Example 6

A sample of the crude reaction mixture obtained by oxidizing cumene with oxygen and containing 46.2% of $\alpha,\alpha$-dimethylbenzyl hydroperoxide was washed with a 5% aqueous acetic acid solution, then with water. The pH of the water wash was 2.5, and the hydroperoxide content of the sample decreased to 45.5%. A portion of the sample, which now was highly acidic, was subjected to an accelerated decomposition test by maintaining it at a temperature of 70° C. At the end of 5 days the amount of hydroperoxide had decreased to 0.4%. Another portion of the acidic sample, the hydroperoxide content of which had now decreased to 43.2%, was stabilized by addition of 2 parts of calcium hydroxide per 100 parts of the acidic material. The calcium hydroxide did not dissolve completely. The stabilized material then was maintained at 70° C. At the end of 4 days the amount of $\alpha,\alpha$-dimethylbenzyl hydroperoxide present was 42.3% and at the end of 21 days was 37.5%.

Example 7

Several reaction mixtures obtained by the oxidation of cumene with oxygen were subjected to an accelerated decomposition test by maintaining them at a temperature of 50° C. A slightly acidic reaction mixture originally containing 41.5% of $\alpha,\alpha$-dimethylbenzyl hydroperoxide was maintained at 50° C. for 16 days. At the end of this time the amount of $\alpha,\alpha$-dimethylbenzyl hydroperoxide had decreased to 1.6%. A comparable reaction mixture, containing 40.5% of $\alpha,\alpha$-dimethylbenzyl hydroperoxide initially and which had been washed with water to neutrality, exhibited under the same temperature conditions a decrease in the amount of hydroperoxide to 29.6% at the end of 16 days and 0.3% at the end of 27 days. Another comparable reaction mixture, containing 43.7% $\alpha,\alpha$-dimethylbenzyl hydroperoxide, was washed with about 50 parts of an 0.385 N aqueous sodium hydroxide solution per 100 parts of the reaction mixture. The stabilized reaction mixture retained, as a result of the caustic wash, 0.002 part of sodium hydroxide per 100 parts of the reaction mixture. Upon being subjected to a temperature of 50° C. the stabilized material exhibited no decrease in the amount of hydroperoxide at the end of 16 days, and at the end of 6 months the amount of hydroperoxide was 40.4%.

Example 8

To a reaction mixture obtained by oxidizing cumene with air and containing 60.0% of $\alpha,\alpha$-dimethylbenzyl hydroperoxide was added 0.5% of sodium dehydroabietate. A sample of the stabilized material was maintained at 50° C. At the end of 60 days the amount of $\alpha,\alpha$-dimethylbenzyl hydroperoxide was 55.6%, and at the end of 7 months the amount of hydroperoxide was 50.1%.

Example 9

Accelerated decomposition tests comparable to those of Examples 7 and 8 were carried out at 50° C. using reaction mixtures containing $\alpha,\alpha$-dimethyl-p-isopropylbenzyl hydroperoxide. A reaction mixture obtained by the oxidation of p-diisopropylbenzene with air and containing 53.3% of the hydroperoxide was filtered, and a sample of the mixture was maintained at 50° C. for 36 days. At the end of this time the sample contained no $\alpha,\alpha$-dimethyl-p-isopropylbenzyl hydroperoxide.

To a similar reaction mixture, containing originally 46.0% of $\alpha,\alpha$-dimethyl-p-isopropylbenzyl hydroperoxide, was added 0.5% of sodium dehydroabietate. A sample of the stabilized material was maintained at 50° C. At the end of 6 days the amount of hydroperoxide had decreased to 44.3%. Likewise, the amount of hydroperoxide at the end of 27 days was 42.7%, and at the end of 60 days was 42.4%.

Although this invention has been set forth in the examples as applied to the air oxidation products of cumene and p-diisopropylbenzene, the invention also is generally applicable to the oxidation products of compounds, such as p-cymene and sec-butylbenzene, which fall under the first structural formula hereinbefore set forth. The oxidation of cumene, p-diisopropylbenzene, p-cymene and sec-butylbenzene leads to reaction products containing $\alpha,\alpha$-dimethylbenzyl, $\alpha,\alpha$-dimethyl-p-isopropylbenzyl, $\alpha,\alpha$-dimethyl-p-methylbenzyl, and $\alpha,\alpha$-ethylmethylbenzyl hydroperoxides, respectively. Also, in the case of p-diisopropylbenzene, $\alpha,\alpha,\alpha',\alpha'$-tetramethyl-p-xylylene dihydroperoxide may be obtained. The aromatic nucleus shown by the structural formula need not be only that derived from benzene, for compounds containing aromatic nuclei derived from naphthalene, anthracene and phenanthrene also are operable. The aromatic nucleus may be substituted with alkyl groups such as methyl, ethyl, propyl, isopropyl, butyl, isobutyl, secondary butyl, tertiary butyl, and the like. The alkyl groups as represented by $R_1$ and $R_2$ may be such as those previously indicated as substituents in the aromatic nuclei and $R_1$ and $R_2$ may be either the same or different. The air oxidation of the compounds falling under the structural formula may be carried out upon the compounds themselves if they are liquids, or upon solutions of the compounds if the latter are solids. Furthermore, the oxidation may be carried out in the presence of an aqueous medium such as liquid water or an aqueous alkali. Any oxygen-containing gas may be used, such as pure or commercial oxygen or air. Catalysts may be used to accelerate the oxidation, and the reaction may be carried out at a temperature between about 25° and about 140° C. When using an aqueous medium during oxidation, the temperature may be between about 25° and about 95° C., preferably between about 50° and about 90° C. Generally speaking, when it is desired to obtain high yields of hydroperoxides, the temperature is preferably maintained between about 60° and about 95° C. and the oxidation is carried out in the absence of a catalyst and using an aqueous alkali as the aqueous medium.

In carrying out this invention the oxidation reaction mixtures, such as those obtained from p-cymene, cumene or diisopropylbenzene by air oxidation, may be treated either per se or after first removing unreacted hydrocarbons or by-products of the oxidation such as tertiary alcohols and acetophenones, or both. Such a removal may be accomplished, for example, by distillation under greatly reduced pressure. A separation of reaction mixture components also may be effected by the addition of a 25–40% aqueous sodium hydroxide solution to the reaction mixture, in which case there is formed a crystalline precipitate comprising an addition compound of the hydroperoxide and the sodium hydroxide. The hydroperoxide may be regenerated from this crystalline precipitate by the addition of an acid at low temperatures, such as about 0° C. The concentrated hydroperoxides obtained by either method may be fractionally distilled at very low pressures in order to obtain them in pure form. The invention relates therefore not only to pure or concentrated hydroperoxides but also to mixtures containing varying amounts of hydroperoxides, for example, the crude reaction mixtures obtained by the oxidation with air or molecular oxygen of the hydrocarbons having the structural formula set forth previously.

The examples have shown several different alkalies which may be used in the stabilization of the $\alpha,\alpha$-dialkylarylmethyl hydroperoxides, and, in general, the water-soluble inorganic alkalies such as the water-soluble inorganic bases and salts of strong alkalies with weak acids are operable. Exemplary of these materials are the alkali metal and alkaline earth metal hydroxides such as sodium hydroxide, potassium hydroxide, lithium hydroxide, and calcium hydroxide, and the alkali metal salts of weak inorganic acids, such as sodium tetraborate, trisodium phosphate, potassium carbonate, and the like. These alkaline materials may be used in aqueous solution if the presence of slight amounts of water is not objectionable in the final composition, since the hydroperoxides themselves will tolerate a small proportion of water.

Examples of salts of strong alkalies with weak acids are the water-soluble salts of weak organic acids. In particular, the acids which form soaps, such as the higher fatty acids, for example, stearic, oleic, palmitic, lauric, linoleic, ricinoleic, the commercially available mixtures obtained by the hydrolysis or saponification of commercial oils, fats, and the like; the resin acids or commercial rosins and their modifications, such as dihydroabietic acid, tetrahydroabietic acid, dehydroabietic acid, hydroxytetrahydroabietic acid, hydrogenated rosin, disproportionated or dehydrogenated rosin, and polymerized rosin; and the naphthenic acids, are suitable for salt formation with alkali metals and alkaline earth metals, and all such salts are operable in accordance with this invention. In general, the stronger the water-soluble inorganic alkali, the more effective it is. A high dissociation constant, although not a direct measure, is an indication of effectiveness in the stabilization treatment of this invention.

The amount of the water-soluble inorganic alkali stabilizing agent to be used depends on the nature of the hydroperoxide and on the agent itself. In general, however, the amount of alkali, based on the hydroperoxide, may be from about 0.01 to about 5.0%, preferably from about 0.05 to about 3.0%. A very applicable range is from about 0.1 to about 1.0%, and a particularly useful amount is about 0.5%.

The products obtained according to this invention find various commercial applications. The stabilized hydroperoxides, such as stabilized $\alpha,\alpha$-dimethylbenzyl hydroperoxide, for example, are excellent catalysts for the polymerization of vinyl, vinylidene, and vinylene compounds. They also are useful in rubber reclaiming, in flotation, and in kier boiling, bleaching, and other textile operations.

What we claim and desire to protect by Letters Patent is:

1. An $\alpha,\alpha$-dialkylarylmethyl hydroperoxide stabilized with from about 0.01 to about 5.0%, based on the hydroperoxide, of a water-soluble inorganic alkali.

2. An $\alpha,\alpha$-dialkylarylmethyl hydroperoxide stabilized from about 0.05 to about 3.0%, based on the hydroperoxide, of a water-soluble inorganic alkali.

3. An $\alpha,\alpha$-dialkylarylmethyl hydroperoxide stabilized with from about 0.1 to about 1.0%, based on the hydroperoxide, of a water-soluble inorganic alkali.

4. An α,α-dialkylarylmethyl hydroperoxide stabilized with about 0.5%, based on the hydroperoxide, of a water-soluble inorganic alkali.

5. An α,α-dialkylarylmethyl hydroperoxide stabilized with from about 0.01 to about 5.0%, based on the hydroperoxide, of an alkali metal hydroxide.

6. An α,α-dialkylarylmethyl hydroperoxide stabilized with from about 0.01 to about 5.0%, based on the hydroperoxide, of sodium hydroxide.

7. α,α-Dimethylbenzyl hydroperoxide stabilized with from about 0.01 to about 5.0%, based on the hydroperoxide, of sodium hydroxide.

8. α,α-Dimethyl-p-isopropylbenzyl hydroperoxide stabilized with from about 0.01 to about 5.0%, based on the hydroperoxide, of sodium hydroxide.

9. An α,α-dialkylarylmethyl hydroperoxide stabilized with from about 0.01 to about 5.0%, based on the hydroperoxide, of an alkali metal salt of a weak organic acid.

10. An α,α-dialkylarylmethyl hydroperoxide stabilized with from 0.01 to about 5.0%, based on the hydroperoxide, of sodium dehydroabietate.

11. α,α - Dimethyl-p-isopropylbenzyl hydroperoxide stabilized with from about 0.01 to about 5.0%, based on the hydroperoxide, of sodium dehydroabietate.

12. An α,α-dialkylarylmethyl hydroperoxide stabilized with from about 0.01 to about 5.0%, based on the hydroperoxide, of an alkali metal salt of a weak inorganic acid.

13. An α,α-dialkylarylmethyl hydroperoxide stabilized from about 0.01 to about 5.0%, based on the hydroperoxide, of potassium carbonate.

14. The process of forming a stable hydroperoxide composition which comprises adding to an α,α-dialkylarylmethyl hydroperoxide from about 0.01 to about 5.0%, based on the hydroperoxide, of a water-soluble inorganic alkali.

EUGENE J. LORAND.
JOHN E. REESE.

REFERENCES CITED

The following references are of record in the file of this patent:

UNITED STATES PATENTS

| Number | Name | Date |
|---|---|---|
| 1,924,786 | Hartmann | Aug. 29, 1933 |
| 2,188,247 | Penn | Jan. 23, 1940 |
| 2,272,577 | Penn | Feb. 10, 1942 |
| 2,403,772 | Vaughan et al. | July 9, 1946 |